Patented Mar. 27, 1923.

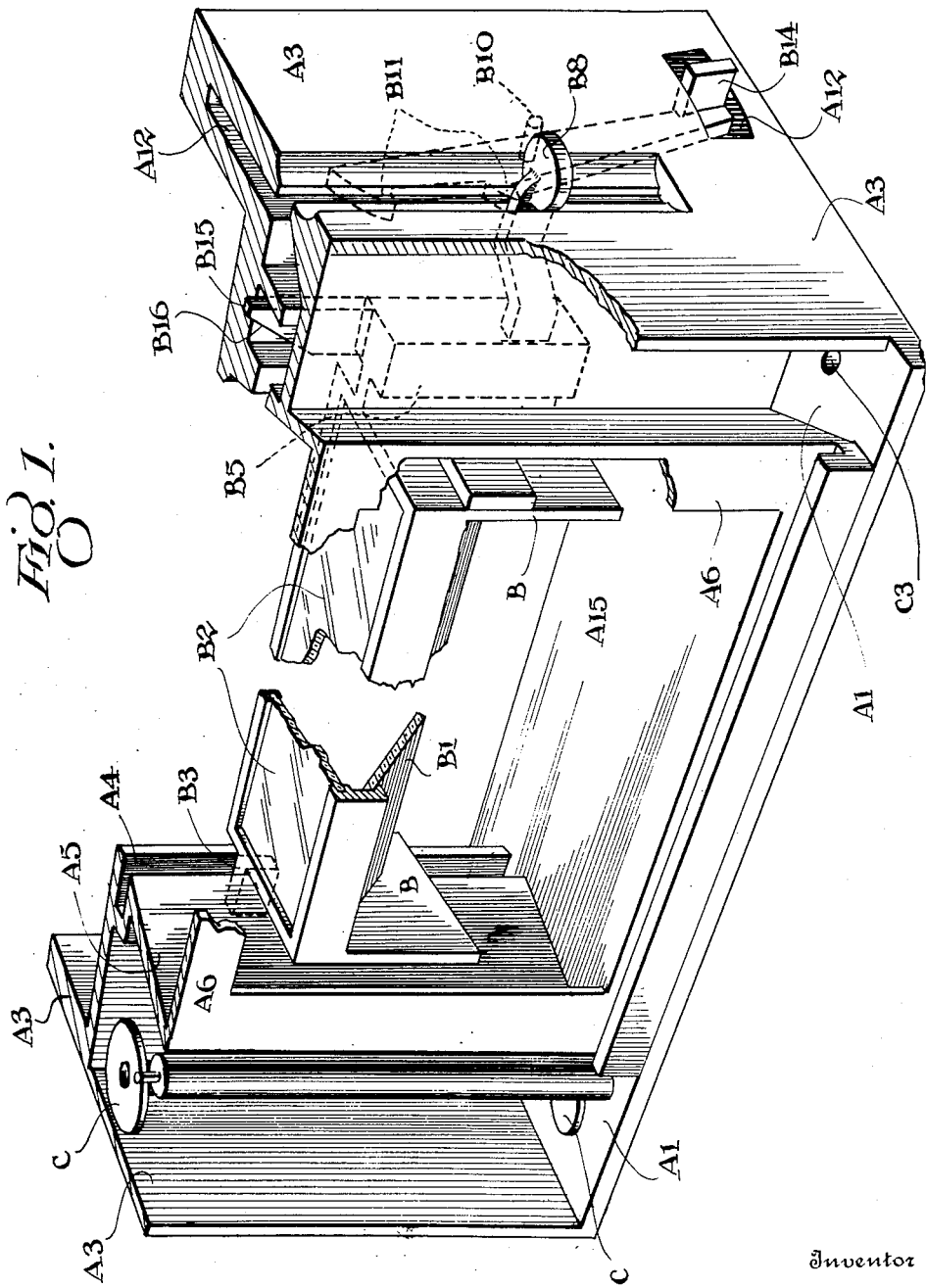

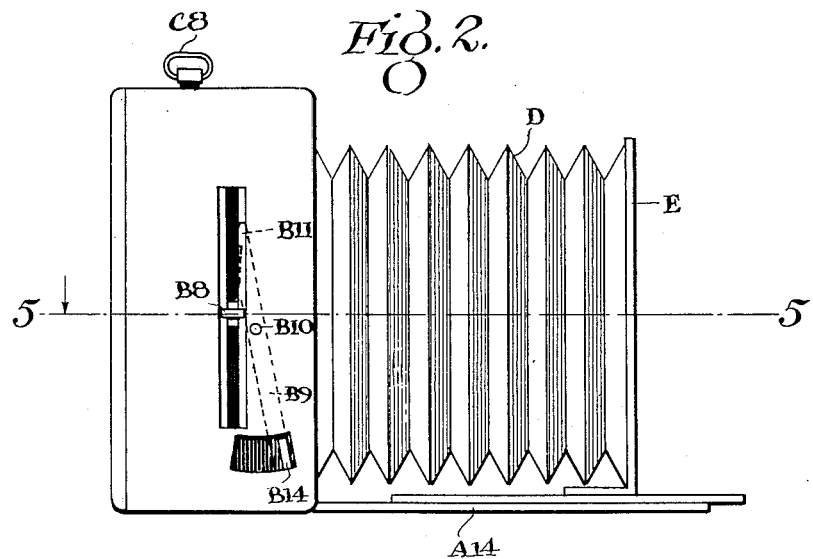
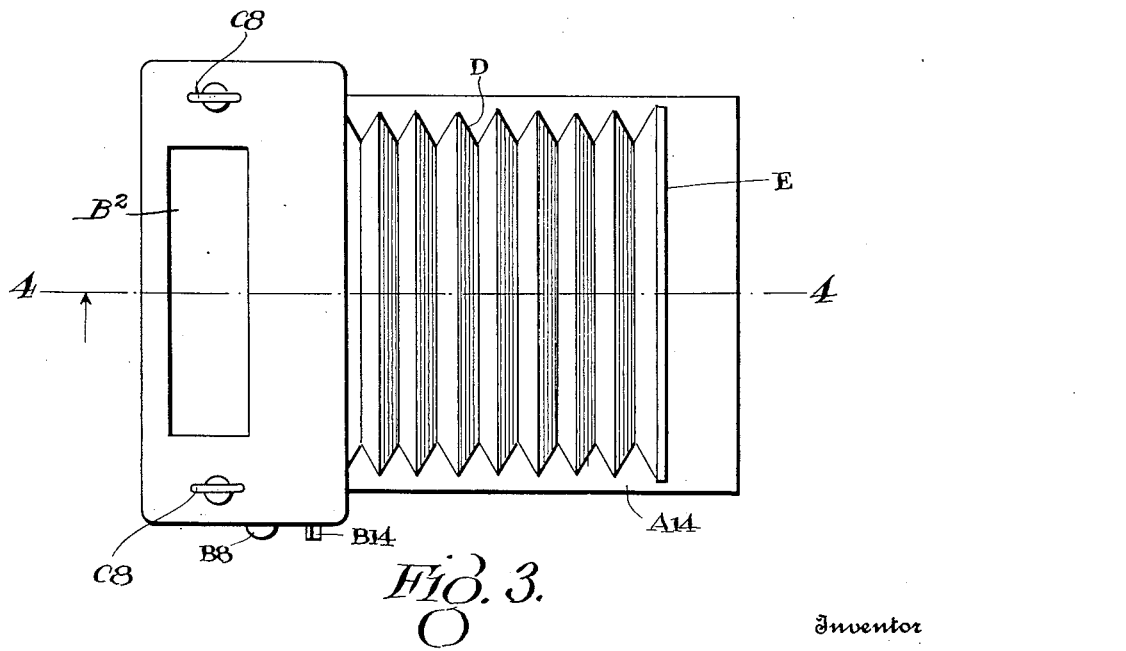

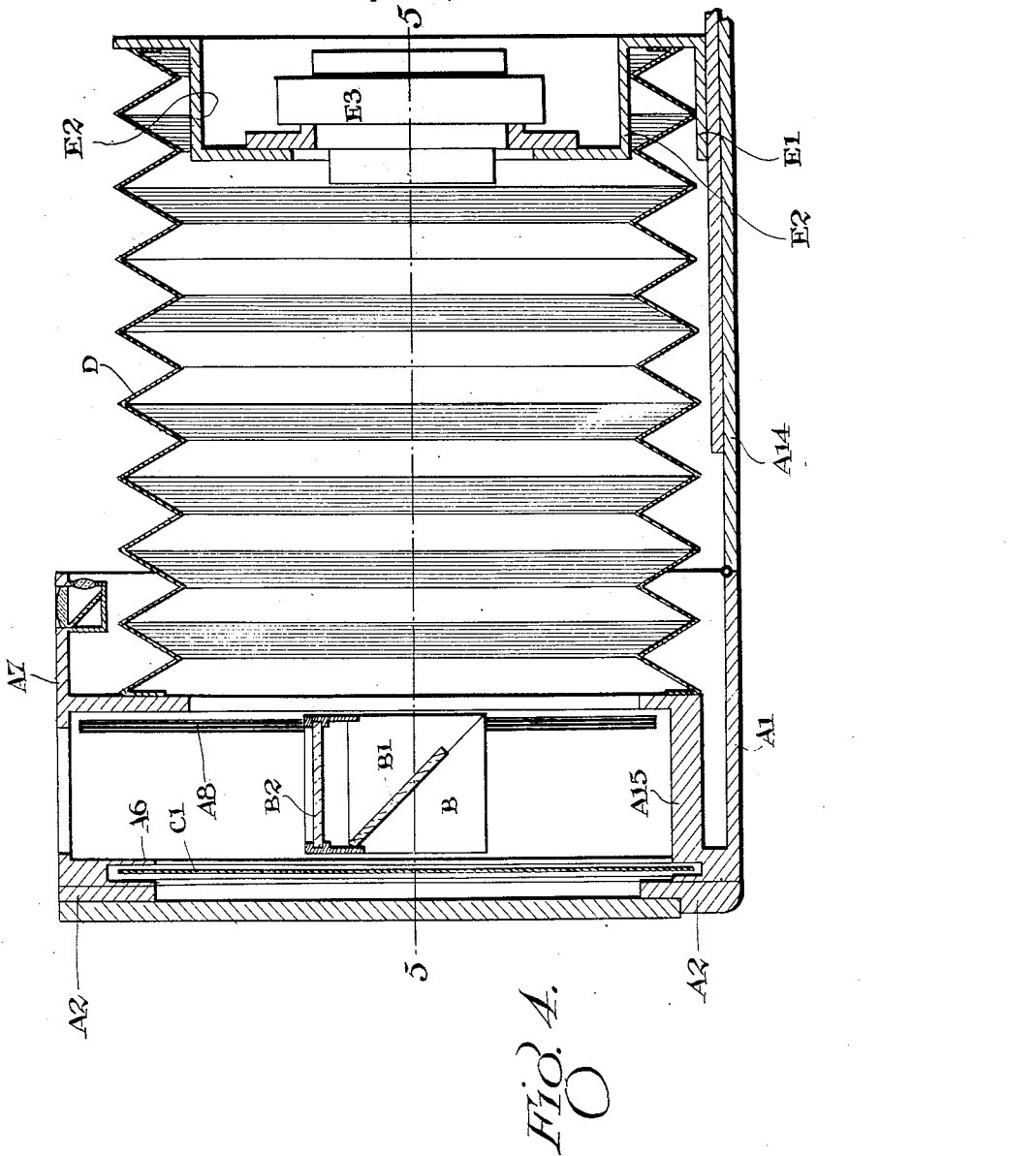

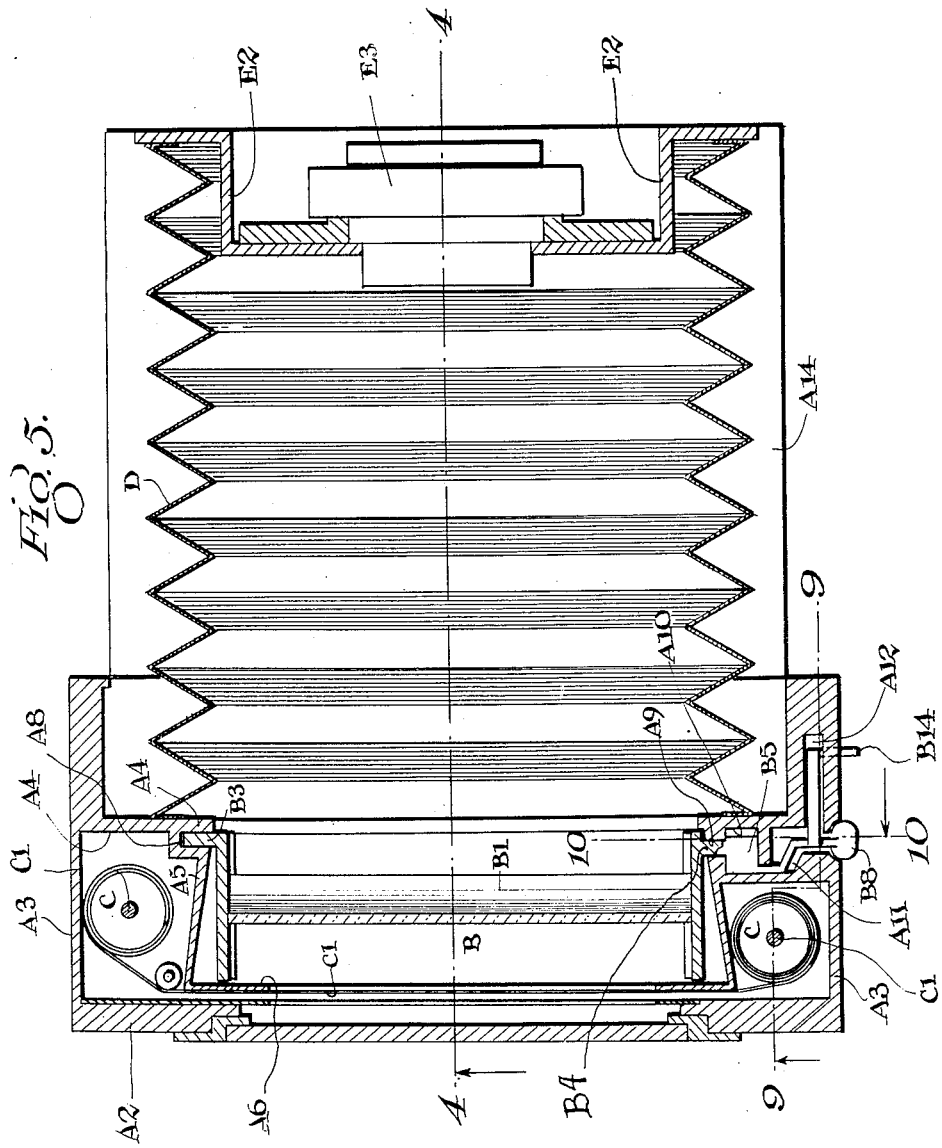

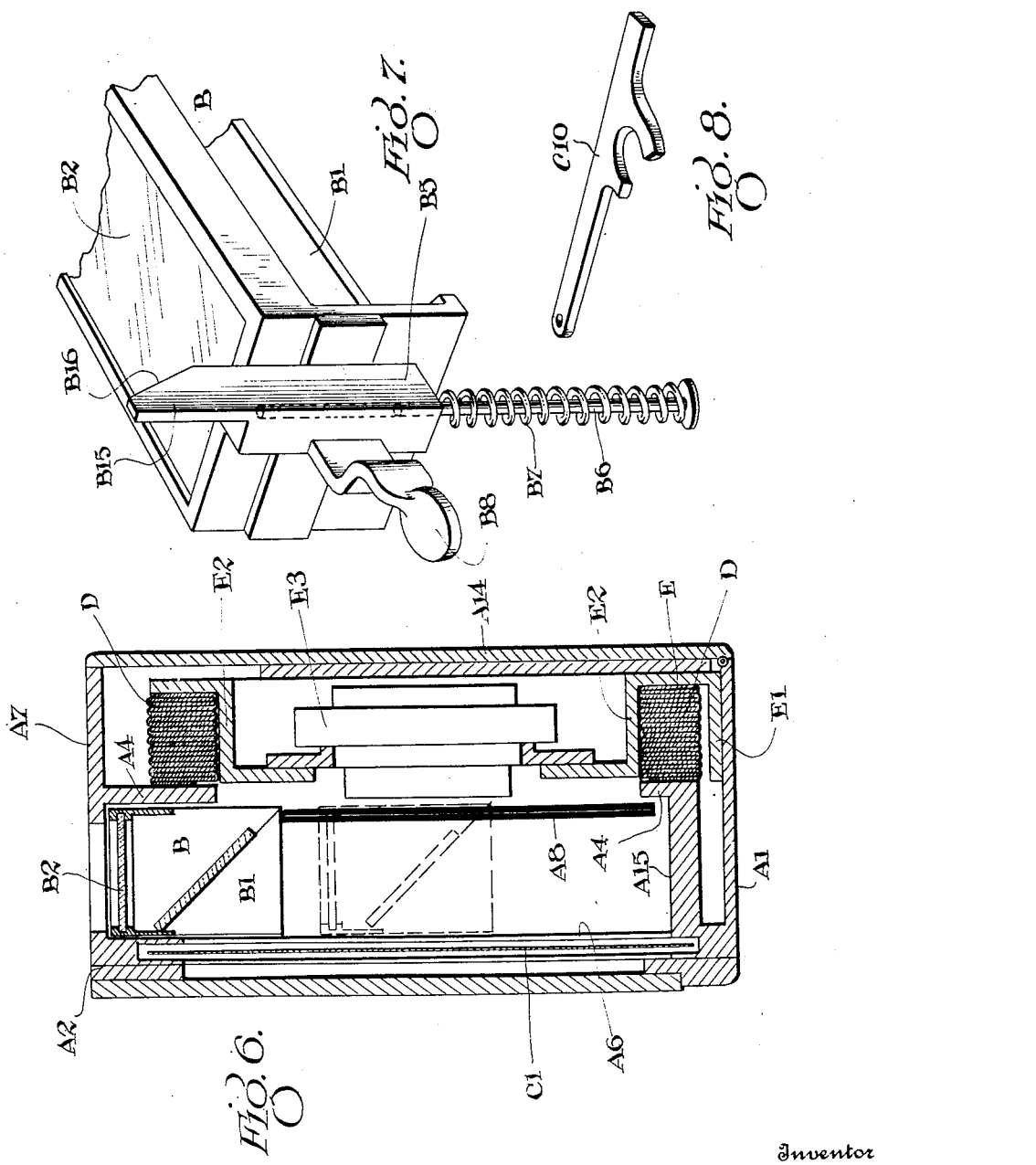

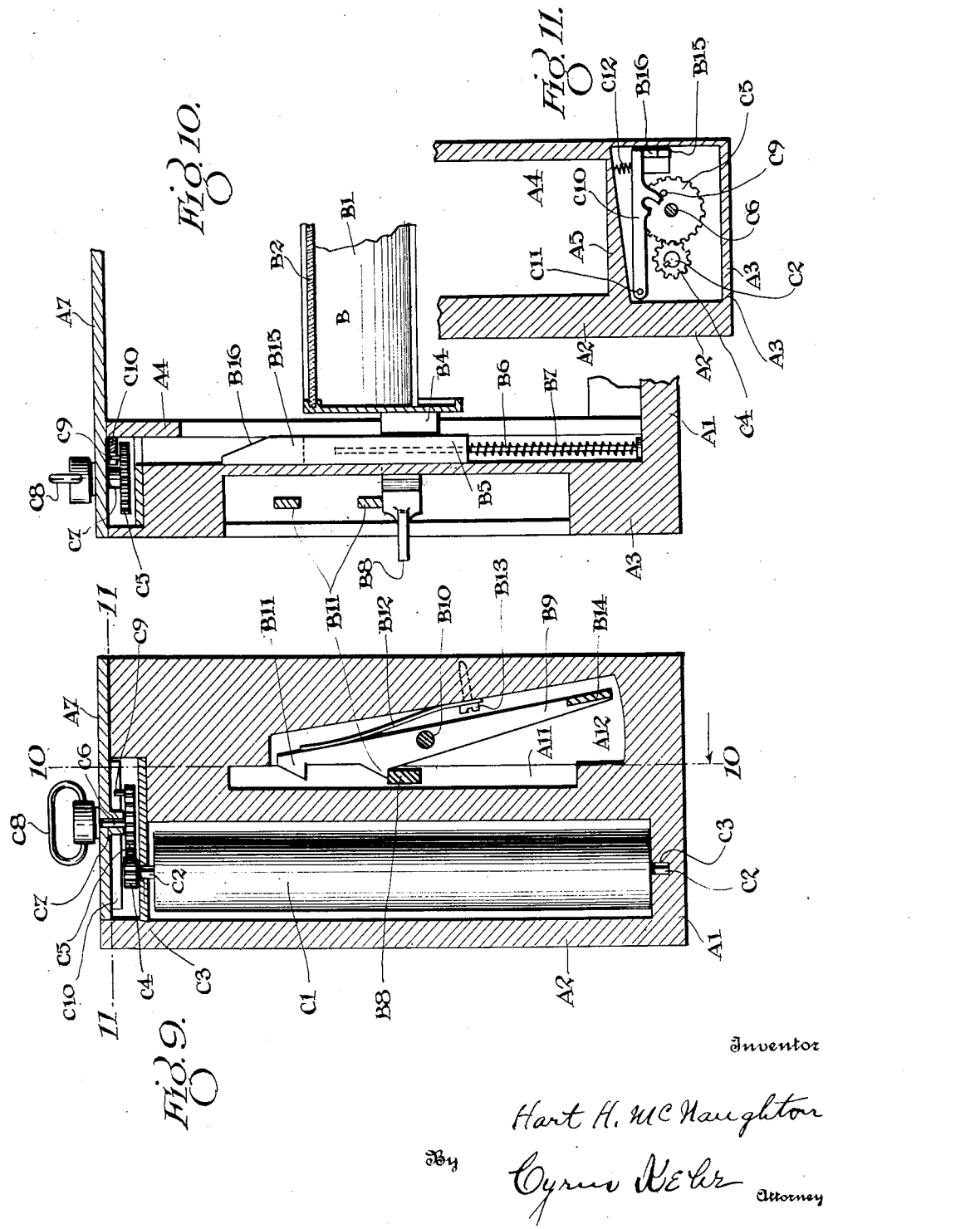

1,449,429

UNITED STATES PATENT OFFICE.

HART H. McNAUGHTON, OF MARYVILLE, TENNESSEE.

CAMERA.

Application filed April 25, 1921. Serial No. 464,102.

*To all whom it may concern:*

Be it known that I, HART H. McNAUGHTON, a citizen of the United States, residing at Maryville, in the county of Blount and State of Tennessee, have invented a new and useful Improvement in Cameras, of which the following is a specification, reference being had to the accompanying drawing.

My improvement relates particularly to means applied to cameras primarily for focusing and secondarily for finding what objects are at the time in the field of the camera.

The object of the invention is to provide in convenient form a ground glass and a reflector adapted to co-operate with the ground glass to place an image of a part of the field upon the ground glass, the ground glass and the mirror being joined to each other for movement in unison within a "well" which is located within the camera body and is parallel to and immediately in front of the negative plane. This mechanism may be associated with a curtain shutter located between the mechanism and the exposure plane; and this form is herein shown and described.

My improvement makes it possible to closely observe the image upon the ground glass plate to the time of exposure. Thus adjustment of the lens carriage may be continued, if the object to be photographed is moving, to keep a well defined image on the ground glass until exposure is made.

In the accompanying drawings,

Fig. 1 is a perspective view of the camera, the back having been removed and other portions broken away;

Fig. 2 is a side elevation, the bellows being extended ready for action;

Fig. 3 is a plan of the same camera;

Fig. 4 is an upright section on the line, 4—4, of Figs. 3 and 5;

Fig. 5 is a horizontal section on the line, 5—5, of Figs. 2 and 4;

Fig. 6 is a section similar to Fig. 4, excepting that the camera is folded;

Fig. 7 is a perspective detail showing a part of the reflector unit and parts associated therewith;

Fig. 8 is a perspective view of a latch or holding member, for one of the curtain shutter reels;

Fig. 9 is an upright section on the line, 9—9, of Fig. 5, looking in the direction of the arrow;

Fig. 10 is an upright section on the line, 10—10, of Figs. 5 and 9, looking in the direction of the arrow;

Fig. 11 is a horizontal section on the line, 11—11, of Fig. 9.

A designates the rigid structure which constitutes the fixed body of the camera. $A^1$ is the base of said body. $A^2$ is the back wall. $A^3$ are the side walls. The upright inner walls, $A^4$ and $A^5$, rise from the base, $A^1$, and, with the walls, $A^2$, and $A^3$, form dark wells or compartments to receive the curtain shutter reels or spools, C. $A^7$ is the top wall of said body. This wall extends across the shutter reels or spools and also across the space between the reels. But in said top wall is a rectangular opening to the well in which the shiftable structure comprising the deflector and the ground glass, to be hereinafter described, is located. Said well is formed in part by the inner rear wall, $A^6$, and the two upright end walls, $A^5$, and the upright front wall, $A^4$. The wall, $A^4$, has a rectangular light opening to which the interior edges of the bellows, D, are attached, said opening being large enough to make room for the light pyramid extending inward from the lens. In the back wall, $A^2$, and the inner back wall, $A^6$ are similar openings. A revolving back or similar means for holding sensitized plates (not shown) is applied across the rear of the wall, $A^2$, to cover the opening in said wall.

The distance between the front wall, $A^4$, and the rear wall, $A^6$, of the well is less than the height of the rectangular light opening in the front wall, $A^4$, of the well. The upright end walls, $A^5$, of the well meet the upright edges of the light opening in the wall, $A^4$. Thus the horizontal measurement of the well transversely to the camera axis is the same as the corresponding measurement of the opening in the wall, $A^4$, while the horizontal measurement of the well parallel to the camera axis is less than the height of the rectangular light opening. Thus reducing the cross-section of the well aids in darkening the well. Furthermore, this permits the use in the well of a reflecting structure or unit which is as long horizontally as the horizontal dimension of the light opening and which unit has a height less than the height of said light opening, as will be described farther on.

The lens carriage door, $A^{14}$, is hinged by its lower edge to the front edge of the base, $A^1$. The lens carriage, E, is applied to said door in the usual manner, to slide outward to the exterior edge of said door and to slide inward far enough to permit the closing of the door. On the axial line of the camera, the carriage has a rearward extension, $E^2$, which supports the lens mounting, $E^3$. This rearward extension is preferably rectangular in cross section. The purpose of said rearward extension is to permit closer folding of the camera, the lens mounting reaching rearward into the opening in the forward wall of the well.

B designates the reflecting structure or unit. This comprises a mirror, $B^1$, and a ground glass $B^2$. The mirror is oblique and directed forward and upward and the ground glass is located above the mirror and is horizontal and fills the cross section of the well. In the reflecting unit, the mirror and the ground glass are joined in any convenient manner.

The reflecting unit is movable up and down in the well. When the camera is unfolded preparatory to making an exposure, said unit is to be lowered so as to bring the mirror into the axis of the camera, the mirror then reflecting light rays from the lens upward into the ground glass in the same relation as said rays would reach the sensitized plate if the reflecting unit were raised out of range of the light pyramid. While the reflecting unit is in this position the image on the ground glass is to be observed by looking down into the well. When exposure is to be made, the reflecting unit is to be first moved upward. Then the shutter is to move in front of the opening in the wall, $A^6$, to make the exposure. With the reflecting unit I have associated mechanism for manually moving said unit downward into the observation position and for automatically and quickly moving the reflecting unit upward when an exposure is to be made. The latter means comprises a spring mechanism against the action of which the reflecting unit is forced downward into the observation position. Thus the upper position of said unit may be regarded as the rest or normal position, while the lower position is regarded as the temporary or observation position.

The reflecting unit is made large enough in its horizontal dimensions to fill the space within the well, allowance being made for bodily up-and-down movement of the structure. Since the upright end walls, $A^5$, of the well meet the upright edges of the wall, $A^4$, the length of the reflecting unit is sufficient to extend entirely across the rectangular light opening in the wall $A^4$. But since the distance between the front wall, $A^4$, and the rear wall, $A^6$, of the well is less than the height of said light opening, the horizontal dimension of the reflecting unit parallel to the camera axis is less than the height of said light opening. Under these conditions, the placing of the mirror at its proper angle (45°) brings the upright dimensions of the reflecting unit less than the upright dimension or height of the light opening. This makes it possible to place the top of the reflecting unit—the ground glass, $B^2$—lower than the upper part of the light opening. The reflecting unit may ordinarily be moved downward into the axis of the camera, but said unit may be moved still further down so that it will extend horizontally across the lower part of the light opening. The lower the reflecting unit is placed, the deeper and the darker will be the well. If the ground glass, $B^2$, were at rest at the upper limit of the light opening, the depth of the well would be limited accordingly and the ground glass would be correspondingly exposed to external light. The mechanism for controlling the movements of the reflecting unit permits moving said unit downward more and more to increase the strength of the image on the ground glass by reduction of light in the well above the ground glass. When such reduction of light above the ground glass has been made, the image will become sufficiently clear to guide the operator in moving the lens into focus position.

It will be observed that the ground glass of the reflecting unit will not receive the entire image transmitted through the light opening or the light pyramid. The image in the ground glass will be complete horizontally, but only a part of the height of the image will appear on the ground glass. For practical purposes this is sufficient. The entire field may be shown on the ground glass by moving the mirror up and down. For focusing, only a part of the image is needed, and for determining the field it is ordinarily sufficient to determine the limits in the horizontal direction. That can be done when the reflecting unit is at any height opposite the light opening of the wall $A^4$.

The mechanism for raising said unit comprises a spring as will be hereinafter described. The curtain shutter is released by the reflecting unit during the latter part of the upward movement of said unit, as will be hereinafter described.

The spools or reels, C, are of ordinary form and to them is applied the curtain shutter $C^1$, of ordinary form.

The means for supporting and guiding and shifting the reflecting unit or structure, B, will now be described.

At the left hand side of the camera, at the meeting of the walls $A^4$ and $A^5$ there is an upright channel, $A^8$, which forms a guideway to receive a flange or tongue, $B^3$, on the structure, B. At the right hand side of the camera is a similar channel, $A^9$, which forms a guideway to receive a similar flange, $B^4$. Said flanges, $B^3$ and $B^4$, are sufficiently free in said channels to permit sliding up and down in the channels. At the right of the channel, $A^9$, is a larger upright chamber, $A^{10}$. In said chamber is a slide member, $B^5$, which is free enough in said chamber to permit up and down sliding and is rigidly joined to the flange, $B^4$. A column, $B^6$, rises from the adjacent floor and is telescoped into the lower end of the slide member, $B^5$. An expanding coil spring, $B^7$, loosely surrounds said column and rests on said floor and bears upward against the lower end of the slide member, $B^5$. The action of said spring is of sufficient force and range to quickly lift the slide member and the reflecting unit into the upper position when the slide member and said unit have been pressed downward into any position below the upper or rest position. A handle, $B^8$, extends outward from the slide member, $B^5$, through a slot, $A^{11}$, extending outward through the adjacent wall, $A^3$. When the slide member, $B^5$, has been lowered for observation, it may be held in either one of two positions by means of a latch arm, $B^9$, located in a chamber, $A^{12}$, and pivoted between its ends at, $B^{10}$. Above its pivot said arm has two hooks, $D^{11}$, either of which may extend across the handle, $B^8$, of the slide member, $B^5$, and hold said handle, whereby the slide member and the reflecting unit are held. A blade spring, $B^{12}$, is located within the chamber, $A^{12}$, and secured by one end to the forward wall of said chamber by means of a screw, $B^{13}$, while the other end of said spring bears against the upper part of the latch arm, $B^9$. The latch arm has a finger piece, $B^{14}$, which extends outward through a slot, $A^{13}$, in the adjacent wall, $A^3$. By pressing said finger piece rearward, the latch arm is tilted to release it from the handle, $B^8$. When observation is to be made, the reflecting unit may be positioned by engagement with either of the hooks, $B^{11}$, or the unit may be moved downward so as to bring the handle, $B^8$, below the lower hook, $B^{11}$. If so desired, the latch arm may be tilted and held in the tilted position, and the reflecting unit then moved up and down for successively receiving on the ground glass different parts of the image which is transmitted through the light pyramid.

As above stated, the shutter release mechanism is actuated mechanically on the arrival of the reflecting unit at its upper limit or above the light pyramid. The mechanism for thus controlling the release of the shutter will next be described.

Each of the curtain spools has at each end a journal, $C^2$, resting in a bearing, $C^3$. The upper of said journals on the spool which is adjacent the latch mechanism extends above its bearing and is surrounded by a smaller spur gear wheel, $C^4$, which meshes with a larger spur gear wheel, $C^5$, which is mounted on a short upright shaft, $C^6$, which extends upward through a bearing, $C^7$, and has on its upper end a finger piece, $C^8$, whereby said shaft and said wheel, $C^5$, may be turned for turning the smaller spur gear wheel and the spool. On the upper face of the wheel, $C^5$, is a stud which is to be engaged by a latch lever, $C^{10}$, which is pivoted at, $C^{11}$, to move in a horizontal plane across a part of the upper face of the gear wheel, $C^5$. The upper end of the slide member, $B^5$, has an extension, $B^{15}$, which, during its upward movement penetrates the plane of the latch member, $C^{10}$. On the extension, $B^{15}$, is the inclined or cam face, $B^{16}$, which, during the upward movement of the extension, bears against said latch member and presses it away from the axis of the spur gear wheel, $C^5$, whereby said latch member is disengaged from the stud, $C^9$. Thus the wheels, $C^5$ and $C^2$ and the adjacent spool are left free to rotate in response to the strain put on the curtain by the other spool. An expanding spring $C^{12}$, located behind the latch lever, $C^{10}$, constantly presses said lever toward the axis of the wheel, $C^5$, whereby the latch lever automatically enters the path of the stud, $C^9$, when the slide member. $B^5$, has been lowered far enough to bring the extension, $B^{15}$, below the plane of the latch member, $C^{10}$. Before the shutter is wound on the adjacent spool, the slide member should be depressed far enough to make engagement with one or the other of the hooks with the latch member $B^9$.

It is to be understood that the other curtain spool has associated with it a spring against the action of which that spool is rotated when the curtain is drawn away from that spool and wound on the other spool, as is already known in this art.

I claim as my invention:

1. In a camera, the combination of upright walls forming a well, the forward of said walls having a light opening, a reflecting unit movable up and down in said well, a column rising from the floor, an expanding spring surrounding said column and in operative relation with the reflecting unit to normally press said unit upward, and latch mechanism for holding the reflecting unit when said unit is in the light pyramid, substantially as described.

2. In a camera, the combination of upright walls forming a well, the forward of said walls having a light opening, a reflecting unit movable up and down in said well and having a height less than the height of said light opening, a column rising from the floor, an expanding spring surrounding said column and in operative relation with the reflecting unit to normally press said unit upward, and latch mechanism for holding the reflecting unit when said unit is in the light pyramid, substantially as described.

3. In a camera, the combination of upright walls forming a well, the forward of said walls having a light opening, a reflecting unit movable up and down in said well, an expanding spring in operative relation with the reflecting unit to normally press said unit upward, and latch mechanism for holding the reflecting unit in either of two positions when said unit is in the light pyramid, substantially as described.

4. In a camera, the combination of upright walls forming a well, the forward of said walls having a light opening, a reflecting unit movable up and down in said well and having a height less than the height of said light opening, an expanding spring in operative relation with the reflecting unit to normally press said unit upward, and latch mechanism for holding the reflecting unit in either of two positions when said unit is in the light pyramid, substantially as described.

5. In a camera, the combination of upright walls forming a well, the forward of said walls having a light opening, and said walls forming upright guide ways for a reflecting unit, a reflecting unit movable up and down on said guide ways, an arm connected with said reflecting unit and extending outward through said walls, a spring normally pressing said reflecting unit upward, and latch mechanism for holding the reflecting unit below its rest position against the upward pressure of said spring, substantially as described.

6. In a camera, the combination of upright walls forming a well, the forward of said walls having a light opening, and said walls forming upright guide ways for a reflecting unit, a reflecting unit movable up and down on said guide ways and having a height less than the height of said light opening, an arm connected with said reflecting unit and extending outward through said walls, a spring normally pressing said reflecting unit upward, and latch mechanism for holding the reflecting unit below its rest position against the upward pressure of said spring, substantially as described.

7. In a camera, the combination of upright walls forming a well, the forward of said walls having a light opening, and said walls forming upright guide ways for a reflecting unit and a slide member, a reflecting unit movable up and down on said guide ways, a slide member and an arm supported by the reflecting unit and said arm extending outward through said walls, a spring normally pressing said slide member upward, and latch mechanism for holding said arm against the upward pressure of said spring when the reflecting unit is below its rest position, substantially as described.

8. In a camera, the combination of upright walls forming a well, the forward of said walls having a light opening, and said walls forming upright guide ways for a reflecting unit and a slide member, a reflecting unit movable up and down on said guide ways, an arm connected with said reflecting unit and extending outward through said walls, a slide member on said arm, a spring normally pressing said slide member upward, and latch mechanism for holding said arm against the upward pressure of said spring when the reflecting unit is below its rest position, substantially as described.

9. In a camera, the combination of upright walls forming a well, the forward of said walls having a light opening, and said walls forming upright guide ways for a reflecting unit and a slide member, a reflecting unit movable up and down on said guide ways and having a height less than the height of said light opening, an arm connected with said reflecting unit and extending outward through said walls, a slide member on said arm, a spring normally pressing said slide member upward, and latch mechanism for holding said arm against the upward pressure of said spring when the reflecting unit is below its rest position, substantially as described.

10. In a camera, the combination of upright walls forming a well, the forward of said walls having a light opening, and said walls forming upright guide ways for a reflecting unit, a reflecting unit movable up and down on said guide ways, an arm connected with said reflecting unit and extending outward through said walls, a spring normally pressing said reflecting unit upward, latch mechanism for holding the reflecting unit in either of two positions below its rest position against the upward pressure of said spring, substantially as described.

11. In a camera, the combination of upright walls forming a well, the forward of said walls having a light opening, and said walls forming upright guide ways for a reflecting unit, a reflecting unit movable up and down on said guide ways and having a height less than the height of said light opening, an arm connected with said reflecting unit and extending outward through said walls, a spring normally pressing said reflecting unit upward, and latch mechanism for holding the reflecting unit in either of two positions below its rest position against the upward pressure of said spring, substantially as described.

12. In a camera, the combination of upright walls forming a well, the forward of said walls having a light opening and said walls forming upright guide ways for a reflecting unit and a slide member, a reflecting unit movable up and down on said guide ways, an arm connected with said reflecting unit and extending outward through said walls, a slide member on said arm, a spring normally pressing said slide member upward, and latch mechanism for holding said arm in either of two positions against the upward pressure of said spring when the reflecting unit is below its rest position, substantially as described.

13. In a camera, the combination of upright walls forming a well, the forward of said walls forming a light opening and said walls forming upright guide ways for a reflecting unit and a slide member, a reflecting unit movable up and down on said guide ways and having a height less than the height of said light opening, an arm connected with said reflecting unit and extending outward through said walls, a slide member on said arm, a spring normally pressing said slide member upward, and latch mechanism for holding said arm in either of two positions against the upward pressure of said spring when the reflecting unit is below its rest position, substantially as described.

14. In a camera, the combination of upright walls forming a well, the forward of said walls having a light opening, a reflecting unit movable up and down in said well, an expanding spring in operative relation with the reflecting unit to normally press said unit upward, latch mechanism for holding the reflecting unit when said unit is in the light pyramid, and a spring-actuated shutter in operative relation with the reflecting unit actuating mechanism for releasing the shutter when the reflecting unit rises above the light pyramid, substantially as described.

15. In a camera, the combination of upright walls forming a well, the forward of said walls having a light opening, a reflecting unit movable up and down in said well and having a height less than the height of said light opening, an expanding spring in operative relation with the reflecting unit to normally press said unit upward, latch mechanism for holding the reflecting unit when said unit is in the light pyramid, and a spring-actuated shutter in operative relation with the reflecting unit actuating mechanism for releasing the shutter when the reflecting unit rises above the light pyramid, substantially as described.

16. In a camera, the combination of upright walls forming a well, the forward of said walls having a light opening, a reflecting unit movable up and down in said well, an expanding spring in operative relation with the reflecting unit to normally press said unit upward, latch mechanism for holding the reflecting unit in either of two positions when said unit is in the light pyramid, and a spring-actuated shutter in operative relation with the reflecting unit actuating mechanism for releasing the shutter when the reflecting unit rises above the light pyramid, substantially as described.

17. In a camera, the combination of upright walls forming a well, the forward of said walls having a light opening, a reflecting unit movable up and down in said well and having a height less than the height of said light opening, an expanding spring in operative relation with the reflecting unit to normally press said unit upward, latch mechanism for holding the reflecting unit in either of two positions when said unit is in the light pyramid, and a spring-actuated shutter in operative relation with the reflecting unit actuating mechanism for releasing the shutter when the reflecting unit rises above the light pyramid, substantially as described.

18. In a camera, the combination of upright walls forming a well, the forward of said walls having a light opening, and said walls forming upright guide ways for a reflecting unit, a reflecting unit movable up and down on said guide ways, an arm connected with said reflecting unit and extending outward through said walls, a spring normally pressing said reflecting unit upward, latch mechanism for holding said reflecting unit below its rest position against the upward pressure of said spring, and a spring-actuated shutter in operative relation with the reflecting unit actuating mechanism for releasing the shutter when the reflecting unit rises above the light pyramid, substantially as described.

19. In a camera, the combination of upright walls forming a well, the forward of said walls having a light opening, and said walls forming upright guide ways for a reflecting unit, a reflecting unit movable up and down on said guide ways and having a height less than the height of said light opening, an arm connected with said reflecting unit and extending outward through said walls, a spring normally pressing said reflecting unit upward, latch mechanism for holding the reflecting unit below its rest position against the upward pressure of said spring, and a spring-actuated shutter in operative relation with the reflecting unit actuating mechanism for releasing the shutter when the reflecting unit rises above the light pyramid, substantially as described.

20. In a camera, the combination of upright walls forming a well, the forward of said walls having a light opening, and said walls forming upright guide ways for a reflecting unit and a slide member, a reflecting unit movable up and down on said guide ways, a slide member and an arm supported by the reflecting unit and said arm extending outward through said walls, a spring normally pressing said slide member upward, latch mechanism for holding said arm against the upward pressure of said spring when the reflecting unit is below its rest position, and a spring-actuated shutter in operative relation with the reflecting unit actuating mechanism for releasing the shutter when the reflecting unit rises above the light pyramid, substantially as described.

21. In a camera, the combination of upright walls forming a well, the forward of said walls having a light opening, and said walls forming upright guide ways for a reflecting unit and a slide member, a reflecting unit movable up and down on said guide ways, an arm connected with said reflecting unit and extending outward through said walls, a slide member on said arm, a spring normally pressing said slide member upward, latch mechanism for holding said arm against the upward pressure of said spring when the reflecting unit is below its rest position, and a spring-actuated shutter in operative relation with the reflecting unit actuating mechanism for releasing the shutter when the reflecting unit rises above the light pyramid, substantially as described.

22. In a camera, the combination of upright walls forming a well, the forward of said walls having a light opening, a reflecting unit movable up and down in said well, an expanding spring in operative relation with the reflecting unit to normally press said unit upward, latch mechanism for holding the reflecting unit when said unit is in the light pyramid, and an upright curtain spool opposite each end of said well, a curtain joined to said spools, a spring applied to one of said spools to resist winding of the curtain from said spool, winding and locking mechanism located on the other of said spools in operative relation with the reflecting unit actuating mechanism for releasing said spool when the reflecting unit rises above the light pyramid, substantially as described.

23. In a camera, the combination of upright walls forming a well, the forward of said walls having a light opening, a reflecting unit movable up and down in said well and having a height less than the height of said light opening, an expanding spring in operative relation with the reflecting unit to normally press said unit upward, latch mechanism for holding the reflecting unit when said unit is in the light pyramid, and an upright curtain spool opposite each end of said well, a curtain joined to said spools, a spring applied to one of said spools to resist winding of the curtain from said spool, winding and locking mechanism located on the other of said spools in operative relation with the reflecting unit actuating mechanism for releasing said spool when the reflecting unit rises above the light pyramid, substantially as described.

24. In a camera, the combination of upright walls forming a well, the forward of said walls having a light opening, a reflecting unit movable up and down in said well, an expanding spring in operative relation with the reflecting unit to normally press said unit upward, latch mechanism for holding the reflecting unit in either of two positions when said unit is in the light pyramid, and an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

25. In a camera, the combination of upright walls forming a well, the forward of said walls having a light opening, a reflecting unit movable up and down in said well and having a height less than the height of said light opening, an expanding spring in operative relation with the reflecting unit to normally press said unit upward, latch mechanism for holding the reflecting unit in either of two positions when said unit is in the light pyramid, and an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

26. In a camera, the combination of upright walls forming a well, the forward of said walls having a light opening, and said walls forming upright guide ways for a reflecting unit, a reflecting unit movable up and down on said guide ways, an arm connected with said reflecting unit and extending outward through said walls, a spring normally pressing said reflecting unit upward, latch mechanism for holding the reflecting unit below its rest position against the upward pressure of said spring, an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

27. In a camera, the combination of upright walls forming a well, the forward of said walls having a light opening, and said walls forming upright guide ways for a reflecting unit, a reflecting unit movable up and down on said guide ways and having a height less than the height of said light opening, an arm connected with said reflecting unit and extending outward through said walls, a spring normally pressing said reflecting unit upward, latch mechanism for holding the reflecting unit below its rest position against the upward pressure of said spring, an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

28. In a camera, the combination of upright walls forming a well, the forward of said walls having a light opening, and said walls forming upright guide ways for a reflecting unit and a slide member, a reflecting unit movable up and down on said guide ways, a slide member and an arm supported by the reflecting unit and said arm extending outward through said walls, a spring normally pressing said slide member upward, latch mechanism for holding said arm against the upward pressure of said spring when the reflecting unit is below its rest position, and an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

29. In a camera, the combination of upright walls forming a well, the forward of said walls having a light opening, and said walls forming upright guide ways for a reflecting unit and a slide member, a reflecting unit movable up and down on said guide ways, an arm connected with said reflecting unit and extending outward through said walls, a slide member on said arm, a spring normally pressing said slide member upward, latch mechanism for holding said arm against the upward pressure of said spring when the reflecting unit is below its rest position, an upright curtain spool opposite each end of said well, a curtain joined to said spools, a spring applied to one of said spools to resist winding of the curtain from said spool, and winding and locking mechanism located on the other of said spools in operative relation with the reflecting unit actuating mechanism for releasing said spool when the reflecting unit rises above the light pyramid, substantially as described.

30. In a camera, the combination of upright walls forming a well, the forward of said walls having a light opening, and said walls forming upright guide ways for a reflecting unit a reflecting unit movable up and down on said guide ways, an arm connected with said reflecting unit and extending outward through said walls, a spring normally pressing said reflecting unit upward, and latch mechanism for holding the reflecting unit in either of two positions below its rest position against the upward pressure of said spring, substantially as described.

31. In a camera, the combination of upright walls forming a well, the forward of said walls having a light opening and said walls forming upright guide ways for a reflecting unit and a guide member, a reflecting unit movable up and down on said guide ways, an arm connected with said reflecting unit and extending outward through said walls, a slide member on said arm, a shaft telescoping said slide member, a spring surrounding said shaft and normally pressing said slide member upward, and latch mechanism for holding said arm against the upward pressure of said spring when the reflecting unit is below its rest position, substantially as described.

32. In a camera, the combination of upright walls forming a well, the forward of said walls having a light opening, and said walls forming upright guide ways for a reflecting unit and a slide member, a reflecting unit movable up and down on said guide ways, a slide member and an arm supported by the reflecting unit and said arm extending outward through said walls, a spring normally pressing said slide member upward, latch mechanism for holding said arm against the upward pressure of said spring when the reflecting unit is below its rest position, an upright curtain spool opposite each end of said wall, a curtain joined to said spools, a spring applied to one of said spools to resist winding of the curtain from said spool, and winding and locking mechanism located on the other of said spools in operative relation with said guide member for releasing said spool when the reflecting unit rises above the light pyramid, substantially as described.

In testimony whereof I have signed my name, this 13th day of April, in the year one thousand nine hundred and twenty-one.

HART H. McNAUGHTON.